US012487553B2

(12) United States Patent
Yoshimura et al.

(10) Patent No.: US 12,487,553 B2
(45) Date of Patent: Dec. 2, 2025

(54) IMAGE FORMING APPARATUS INCLUDES METAL AND RESIN COMPONENTS WITH ENHANCED STABILITY AND FUNCTIONALITY

(71) Applicant: CANON KABUSHIKI KAISHA, Tokyo (JP)

(72) Inventors: Akira Yoshimura, Shizuoka (JP); Takuji Uesugi, Kanagawa (JP); Akitoshi Toyota, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 18/424,546

(22) Filed: Jan. 26, 2024

(65) Prior Publication Data

US 2024/0255891 A1 Aug. 1, 2024

(30) Foreign Application Priority Data

Jan. 31, 2023 (JP) ................................ 2023-012437

(51) Int. Cl.
*G03G 15/00* (2006.01)
*G03G 21/16* (2006.01)

(52) U.S. Cl.
CPC ..... *G03G 21/1619* (2013.01); *G03G 21/1647* (2013.01); *G03G 2215/00675* (2013.01); *G03G 2215/0402* (2013.01)

(58) Field of Classification Search
CPC ........... G03G 15/0806; G03G 15/0865; G03G 15/6529; G03G 21/16; G03G 21/1604; G03G 21/1619; G03G 21/1647; G03G 21/1652; G03G 21/1661; G03G 21/1695; G03G 2215/00675; G03G 2215/0402
See application file for complete search history.

(56) References Cited

U.S. PATENT DOCUMENTS

| | | | | |
|---|---|---|---|---|
| 6,167,221 | A | 12/2000 | Kobayashi | |
| 6,636,338 | B1 | 10/2003 | Kida | |
| 2011/0052251 | A1 | 3/2011 | Kondo | |
| 2011/0129250 | A1 | 6/2011 | Kondo | |
| 2015/0261174 | A1* | 9/2015 | Souda | G03G 21/1619 399/107 |
| 2021/0063945 | A1* | 3/2021 | Kawasumi | G03G 21/1619 |

(Continued)

FOREIGN PATENT DOCUMENTS

| | | | |
|---|---|---|---|
| EP | 1510877 | A2 | 3/2005 |
| JP | H09292815 | A | 11/1997 |
| JP | H1086481 | A | 4/1998 |

(Continued)

*Primary Examiner* — Sophia S Chen
(74) *Attorney, Agent, or Firm* — Canon U.S.A., Inc. IP Division

(57) ABSTRACT

An image forming apparatus includes a first side plate, a second side plate, a first connecting member, the first connecting member being secured to the first side plate at a first securing portion and being secured to the second side plate at a second securing portion, and a frame, the frame being sandwiched between the first side plate and the second side plate and being secured to the first side plate and the second side plate. At least one of the first side plate and the first connecting member is deformed to form the first securing portion, and at least one of the second side plate and the first connecting member is deformed to form the second securing portion.

12 Claims, 12 Drawing Sheets

(56) References Cited

U.S. PATENT DOCUMENTS

| | | | | |
|---|---|---|---|---|
| 2021/0132521 | A1 | 5/2021 | Yamamoto | |
| 2021/0132540 | A1* | 5/2021 | Seto | G03G 21/1619 |

FOREIGN PATENT DOCUMENTS

| | | | |
|---|---|---|---|
| JP | 2005077735 | A | 3/2005 |
| JP | 2008175942 | A | 7/2008 |
| JP | 2015163959 | A | 9/2015 |
| JP | 2020026859 | A | 2/2020 |

* cited by examiner

IMAGE FORMING APPARATUS INCLUDES METAL AND RESIN COMPONENTS WITH ENHANCED STABILITY AND FUNCTIONALITY

BACKGROUND OF THE INVENTION

Field of the Invention

The present invention relates to an image forming apparatus configured to form images on recording materials.

Description of the Related Art

In the prior art, there exist image forming apparatuses, such as printers, copying machines, and multi-function peripherals, that include frames formed using a combination of metal members and resin members.

Japanese Patent Application Laid-Open No. 2005-77735 discusses an image forming apparatus including a frame formed of a pair of side plates, and a conveyance member made of resin and a stay made of sheet metal both attached to the pair of side plates. According to Japanese Patent Application Laid-Open No. 2005-77735, the conveyance member made of resin and the stay made of sheet metal are secured to the pair of side plates with screws.

SUMMARY OF THE INVENTION

The present invention is a further development of conventional technologies.

According to an aspect of the present invention, an image forming apparatus configured to form an image on a recording material includes a first side plate made of metal, a second side plate made of metal, the second side plate facing the first side plate in a first direction, a first connecting member made of metal, the first connecting member being secured to the first side plate at a first securing portion and being secured to the second side plate at a second securing portion, and a frame made of resin, the frame being sandwiched between the first side plate and the second side plate and being secured to the first side plate and the second side plate. One of the first side plate and the frame includes a first hole, an other of the first side plate and the frame includes a first protrusion inserted in the first hole, one of the second side plate and the frame includes a second hole, and an other of the second side plate and the frame includes a second protrusion inserted in the second hole. At least one of the first side plate and the first connecting member is deformed to form the first securing portion, and at least one of the second side plate and the first connecting member is deformed to form the second securing portion.

According to another aspect of the present invention, an image forming apparatus configured to form an image on a recording material includes a first side plate made of metal, a second side plate made of metal, the second side plate facing the first side plate in a first direction, a first connecting member made of metal, the first connecting member being secured to the first side plate at a first securing portion so that the first connecting member is not releasable from the first side plate, and the first connecting member being secured to the second side plate at a second securing portion so that the first connecting member is not releasable from the second side plate, a second connecting member secured to the first side plate and the second side plate so that the second connecting member is releasable from the first side plate and the second side plate, and a frame made of resin, the frame being sandwiched between the first side plate and the second side plate and being secured to the first side plate and the second side plate so that the frame is releasable from the first side plate and the second side plate. In a state where the second connecting member is secured to the first side plate and the second side plate, detachment of the frame from the first side plate and the second side plate is restricted. The frame in a state where the first connecting member is secured to the first side plate and the second side plate is detachable from the first side plate and the second side plate by releasing the securing of the second connecting member and at least one of the first side plate and the second side plate and releasing the securing of the first side plate and the second side plate and the frame.

Further features of the present invention will become apparent from the following description of exemplary embodiments with reference to the attached drawings.

DESCRIPTION OF THE EMBODIMENTS

Various exemplary embodiments of the present invention will be described in detail below with reference to the drawings. Sizes, materials, shapes, and relative positions of components according to the exemplary embodiments described below should be changed as appropriate for a configuration of an apparatus to which the invention is applied and various conditions. Specifically, the exemplary embodiments described below are not intended to limit the scope of the invention.

<Image Forming Apparatus>

Figure 1:
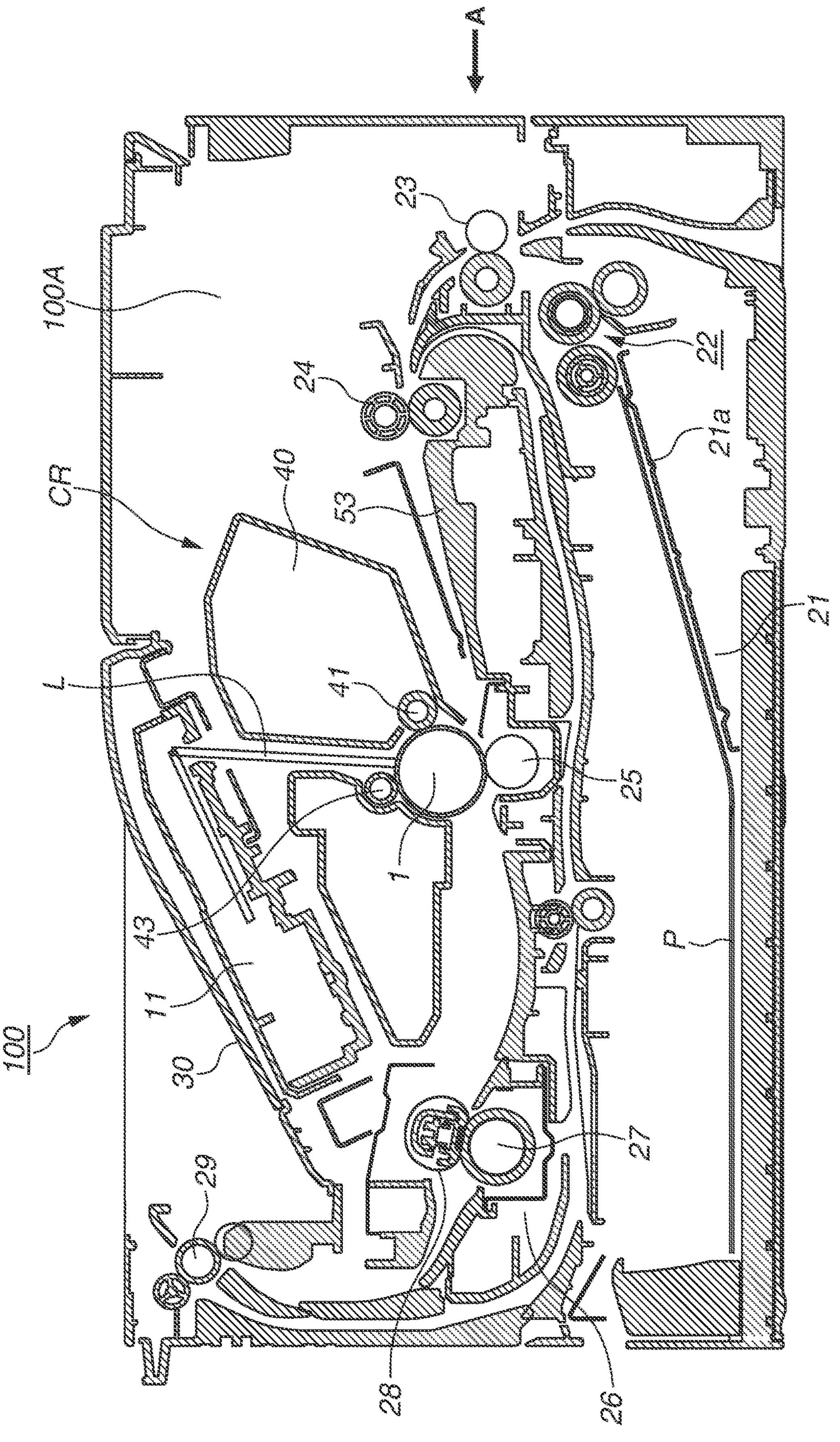
FIG. 1 is a cross-sectional view illustrating an image forming apparatus.

An image forming apparatus 100 according to a first exemplary embodiment will be described with reference to FIG. 1. FIG. 1 is a cross-sectional view illustrating the image forming apparatus 100.

The image forming apparatus 100 according to the present exemplary embodiment forms an image on a sheet P, which is a recording material. The image forming apparatus 100 includes an apparatus body 100A and a cartridge CR removable from the apparatus body 100A. The apparatus body 100A can also be regarded as a part of the image forming apparatus 100 without the cartridge CR.

The apparatus body 100A of the image forming apparatus 100 includes a sheet storage portion 21 provided with a sheet elevator portion 21*a*, a sheet feed portion 22, a pair of conveyance rollers 23, a pair of conveyance rollers 24, a transfer portion (transfer roller) 25, a scanner 11 as an exposure device, a fixing portion 26, a sheet discharge portion 29, and a sheet discharge tray 30.

The cartridge CR includes a photosensitive drum (photosensitive member) 1, a charging member 43, and a development roller 41. The charging member 43 charges the photosensitive drum 1. The development roller 41 that faces the photosensitive drum 1 develops electrostatic latent images formed on the photosensitive drum 1. The cartridge CR includes a development unit (development device) 40 that stores toner as a developing agent and includes the development roller 41.

The sheet P is set on the sheet elevator portion 21*a*. In performing an image forming operation on the sheet P, the sheet P is elevated by the sheet elevator portion 21*a* and is conveyed from the sheet feed portion 22 to the transfer portion 25 via the pairs of conveyance rollers 23 and 24.

The apparatus body 100A of the image forming apparatus 100 is provided with a transfer frame 53. The transfer frame 53 forms at least part of a conveyance path through which the sheet P is conveyed. Part of the transfer frame 53 faces the conveyance path of the sheet P and has a function as a guide portion for guiding the sheet P. Specifically, the transfer frame 53 includes the guide portion that guides the sheet P.

Meanwhile, the photosensitive drum 1 is charged by the charging member 43. The scanner 11 exposes the photosensitive drum 1. The scanner 11 emits laser light L to a surface of the photosensitive drum 1 based on image information, which exposes the surface of the photosensitive drum 1, forming an electrostatic latent image on the surface of the photosensitive drum 1. The toner as a developing agent is fed from the development roller 41 to the photosensitive drum 1, developing the electrostatic latent image formed on the photosensitive drum 1. Thus, a toner image is formed on the photosensitive drum 1.

The transfer portion 25 faces the photosensitive drum 1, and a nip portion is formed between the photosensitive drum 1 and the transfer portion 25. A predetermined voltage is applied from a power source (not illustrated) to the transfer portion 25, with which the transfer portion 25 transfers the toner image formed on the photosensitive drum 1 onto the sheet P.

The fixing portion 26 includes a heating unit 28 and a pressing roller 27. The heating unit 28 includes a fixing film enclosing a heating portion (heater). The fixing portion 26 heats the sheet P with the transferred toner image thereon to fix the toner image to the sheet P. Then, the sheet P is discharged to the sheet discharge tray 30 by the sheet discharge portion 29.

According to the present exemplary embodiment, the image forming apparatus 100 can form images on both sides of the sheet P by conveying the sheet P that has passed through the fixing portion 26 to the transfer portion 25 through a two-sided conveyance path.

As described above, according to the present exemplary embodiment, the image forming apparatus 100 is a laser beam printer that forms a monochrome image on the sheet P as a recording material using an electrophotographic process. The image forming apparatus 100 can be a printer other than a laser beam printer, such as an inkjet printer or a so-called light emitting diode (LED) printer using a LED as an exposure device, and can be an image forming apparatus that forms a color image on the sheet P.

<Framework>

A framework 50 of the image forming apparatus 100 will be described with reference to FIGS. 1, 2, 3, 4A, 4B, 5A, 5B, and 6.

Figure 2:
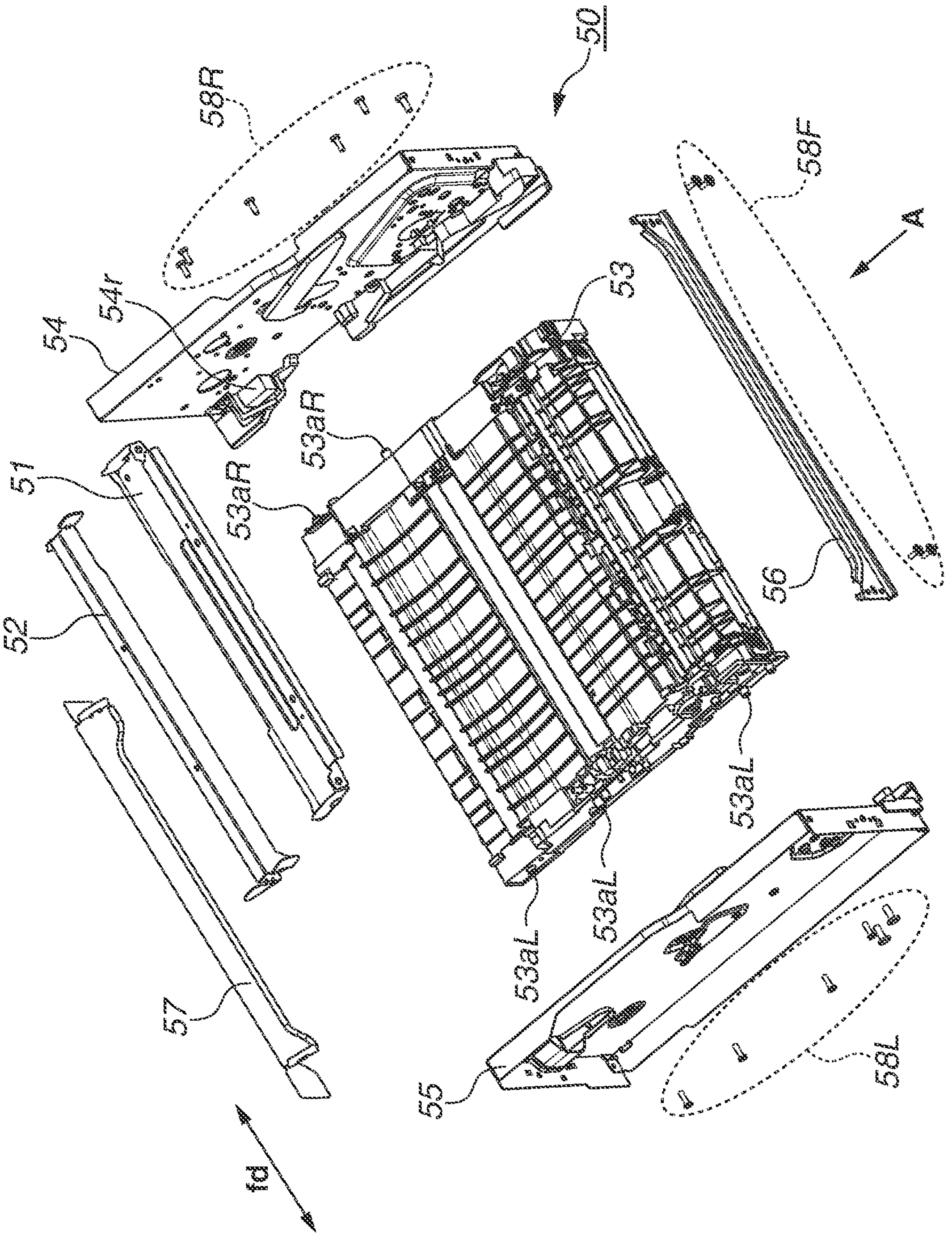
FIG. 2 is an exploded perspective view illustrating a framework of the image forming apparatus.
Figure 3:
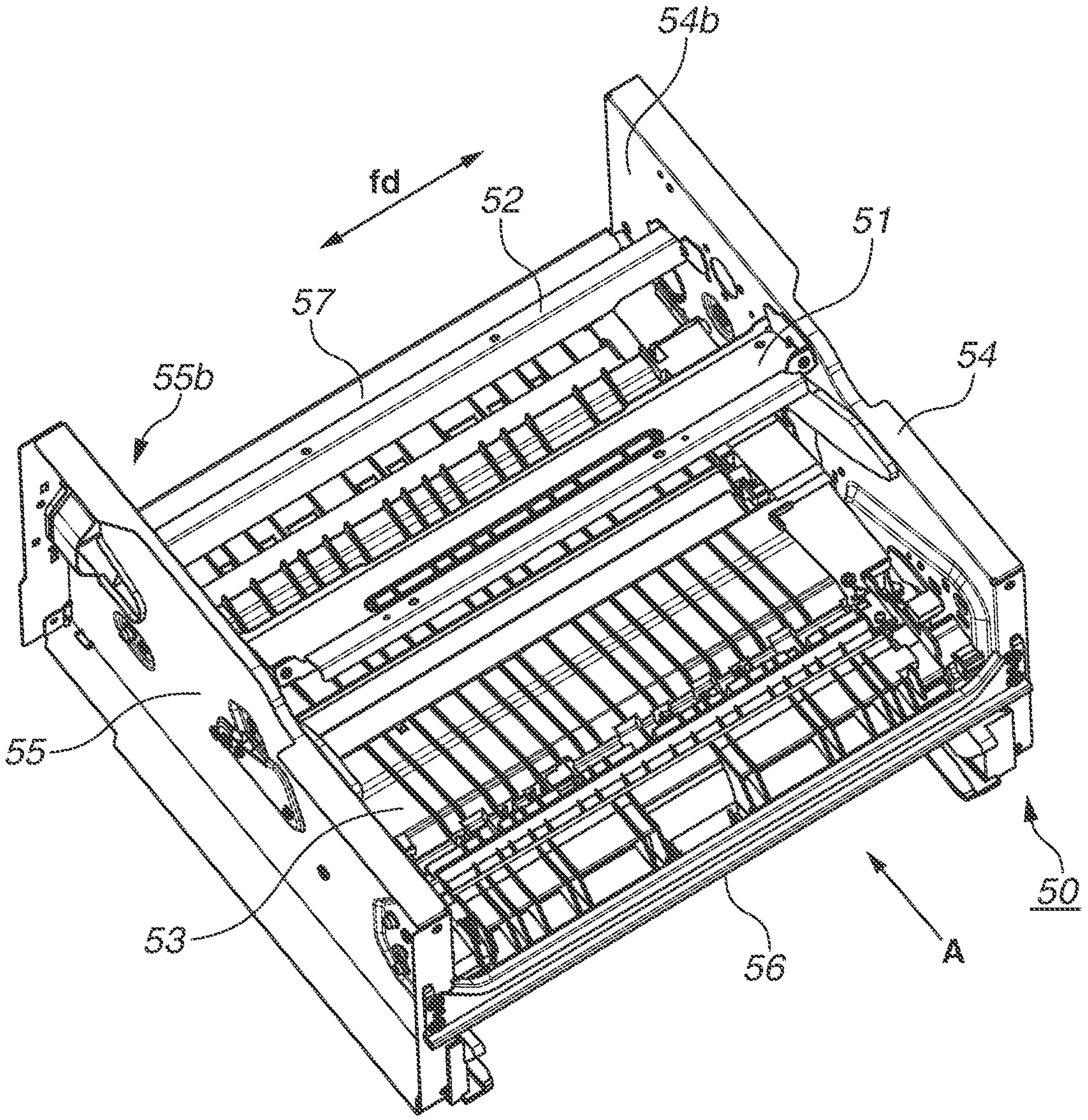
FIG. 3 is a perspective view illustrating the framework of the image forming apparatus.

FIG. 2 is an exploded perspective view illustrating the framework 50 of the image forming apparatus 100, and FIG. 3 is a perspective view illustrating the framework 50 of the image forming apparatus 100. In FIGS. 2 and 3, components, such as the sheet feed portion 22, the pairs of conveyance rollers 23 and 24, and the scanner 11, and an exterior, such as the sheet discharge tray 30, are not illustrated.

Hereinafter, up-down, left-right, and front-rear directions are defined as viewed in an arrow A direction in FIGS. 1, 2, and 3. The up-down direction is parallel to a vertical direction. The arrow A is parallel to the front-rear direction. The front-rear and left-right directions are parallel to a horizontal direction. The up-down direction, the left-right direction, and the front-rear direction are orthogonal to each other.

As illustrated in FIGS. 2 and 3, the framework 50 includes a left side plate 55 and a right side plate 54. In facing directions fd, the left side plate 55 and the right side plate 54 face each other. In the facing directions fd, the conveyance path through which the sheet P is conveyed is situated between the right side plate 54 and the left side plate 55. According to the present exemplary embodiment, the facing directions fd correspond to width directions orthogonal to a conveyance direction of the sheet P. According to the present exemplary embodiment, the left side plate 55 and the right side plate 54 are made of metal, more specifically, sheet metal.

Further, the framework 50 includes a transfer frame (transfer conveyance frame, conveyance frame, resin frame) 53 as a frame, a front scanner stay 51, a rear scanner stay 52, a rear stay 57, and a front stay 56.

In the facing directions fd, the transfer frame 53, the front scanner stay 51, the rear scanner stay 52, and the rear stay 57 are situated between the left side plate 55 and the right side plate 54. The front scanner stay 51 and the rear scanner stay 52 support the scanner 11. The facing directions fd are parallel to the left-right direction.

The front scanner stay 51, the rear scanner stay 52, the rear stay 57, and the front stay 56 are situated parallel to each other to bridge the right side plate 54 and the left side plate 55 and are connected to the right side plate 54 and the left side plate 55. According to the present exemplary embodiment, the front scanner stay 51, the rear scanner stay 52, the rear stay 57, and the front stay 56 are made of metal, more specifically, sheet metal.

The front scanner stay 51, the rear scanner stay 52, and the rear stay 57 are an example of a first connecting member secured to the right side plate 54 and the left side plate 55. Specifically, according to the present exemplary embodiment, the image forming apparatus 100 includes a plurality of first connecting members. According to the present exemplary embodiment, the front scanner stay 51, the rear scanner stay 52, and the rear stay 57 are secured to the right side plate 54 and the left side plate 55 so that the front scanner stay 51, the rear scanner stay 52, and the rear stay 57 are not releasable (not separated or disassembled) from the right side plate 54 and the left side plate 55.

According to the present exemplary embodiment, securing two members so that the two members are not releasable refers to the following securing. Specifically, securing two members so that the two members are not releasable (not separable) refers to a method of securing two members to such an extent that in order to release the securing of the two members, at least one of the two members or a securing member for securing the two members must undergo plastic deformation. The plastic deformation herein includes an action of cutting a target member.

Examples of a method of securing two members so that the two members are not releasable include mechanical fastening, adhesive bonding, and welding. Mechanical fastening includes a method with plastic deformation of at least one of two members (so called formed connection) and a method using rivets as a securing member. In the former case, the securing of the two members is released with plastic deformation of one or both of the two members. In the latter case, the securing of the two members is released with plastic deformation of the rivets as a securing member.

A method of securing two members with screws as a fastening member is different from the securing of two members so that the two members are not releasable according to the present exemplary embodiment because the securing of the two members can be released through the removal of the screws.

The front stay 56 is an example of a second connecting member secured to the right side plate 54 and the left side plate 55. The front stay 56 is secured to the right side plate 54 at the front side of the framework 50 so that the front stay 56 can be released from the right side plate 54, and the front stay 56 is secured to the left side plate 55 at the front side of the framework 50 so that the front stay 56 can be released from the left side plate 55. More specifically, the front stay 56 is secured to the right side plate 54 and the left side plate 55 with a plurality of screws (fastening member) 58F. Thus, the removal of the plurality of screws 58F releases the securing of the front stay 56 and the right side plate 54 and the left side plate 55.

The transfer frame 53 is made of resin and is sandwiched between the right side plate 54 and the left side plate 55 in the facing directions fd. According to the present exemplary embodiment, the transfer frame 53 supports the transfer portion 25 as a rotary member. The transfer frame 53 is made of insulating resin to prevent leakage of the voltage applied to the transfer portion 25. Further, the transfer frame 53 supports one of the pair of conveyance rollers 23, one of the pair of conveyance rollers 24, and part of the sheet feed portion 22. The facing directions fd correspond to the direction of the rotational axis of the transfer portion 25.

Next, the connection of the transfer frame 53, the front scanner stay 51, the rear scanner stay 52, the rear stay 57, and the front stay 56 to the left side plate 55 and the right side plate 54 will be described below.

As illustrated in FIG. 3, a support surface 55*b* of the left side plate 55 and a support surface 54*b* of the right side plate 54 face each other in the facing directions fd. The support surface 55*b* of the left side plate 55 and the support surface 54*b* of the right side plate 54 are surfaces that intersect with (desirably orthogonal to) the facing directions fd. The transfer frame 53, the front scanner stay 51, the rear scanner stay 52, and the rear stay 57 are secured to the support surface 55*b* of the left side plate 55 and the support surface 54*b* of the right side plate 54.

Figure 4A:
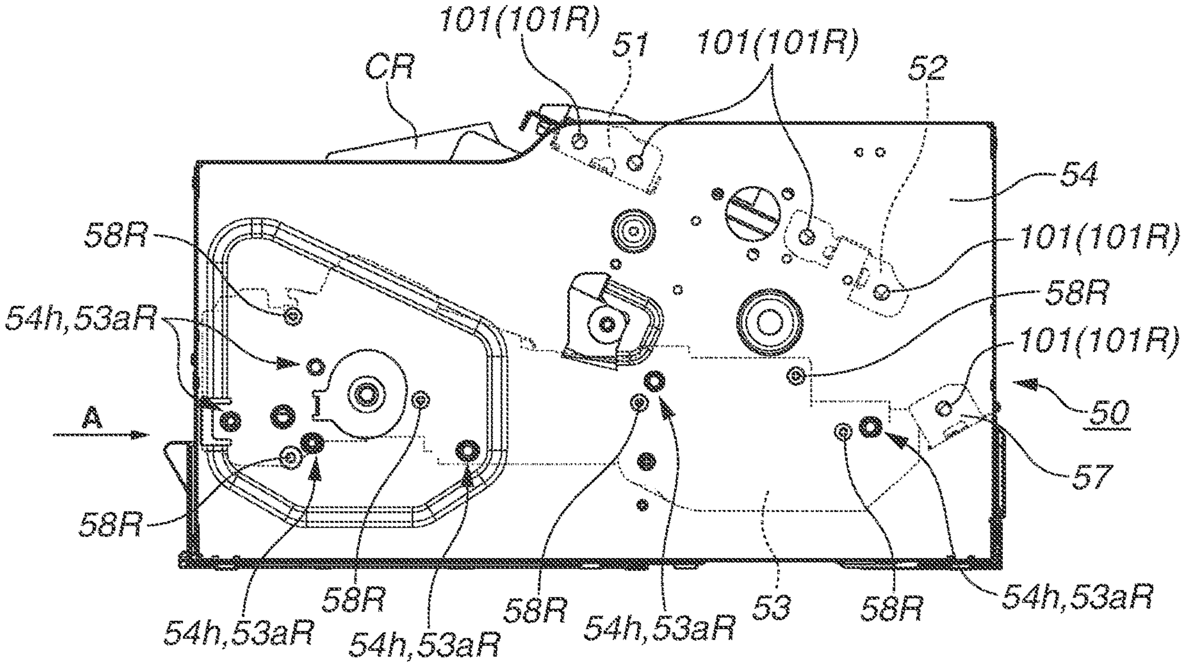
FIGS. 4A and 4B are side views illustrating the framework of the image forming apparatus.
Figure 4B:
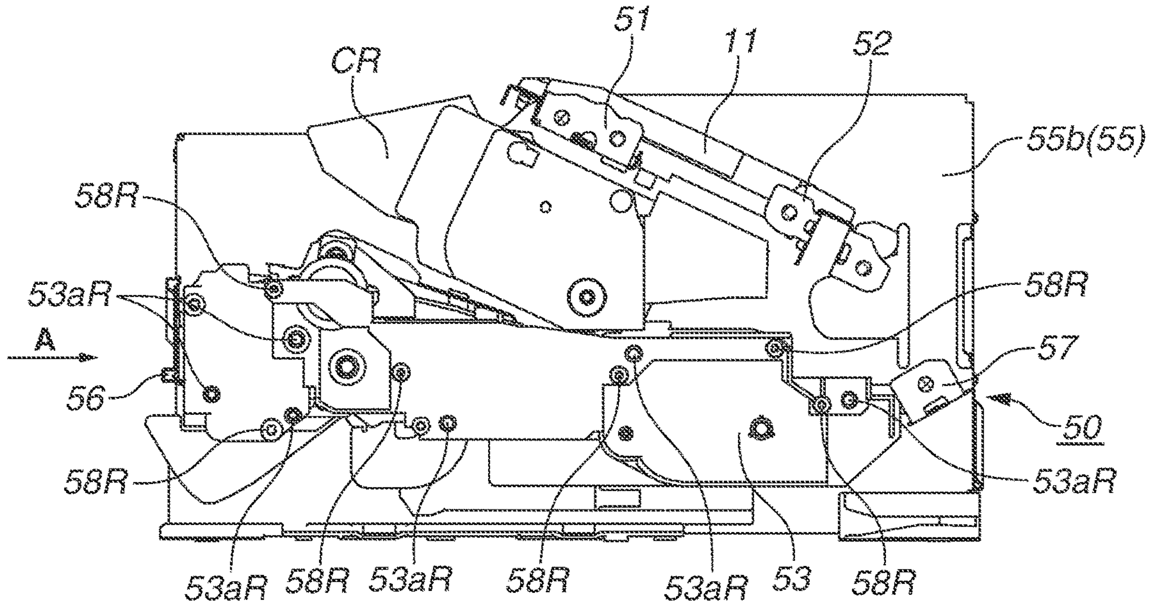

FIGS. 4A and 4B are side views illustrating the framework 50 of the image forming apparatus 100.

FIGS. 4A and 4B are side views illustrating the framework 50 viewed from the facing directions fd, more specifically, side views illustrating the framework 50 viewed from the right side. In FIG. 4B, the right side plate 54 is not shown.

Figure 5A:
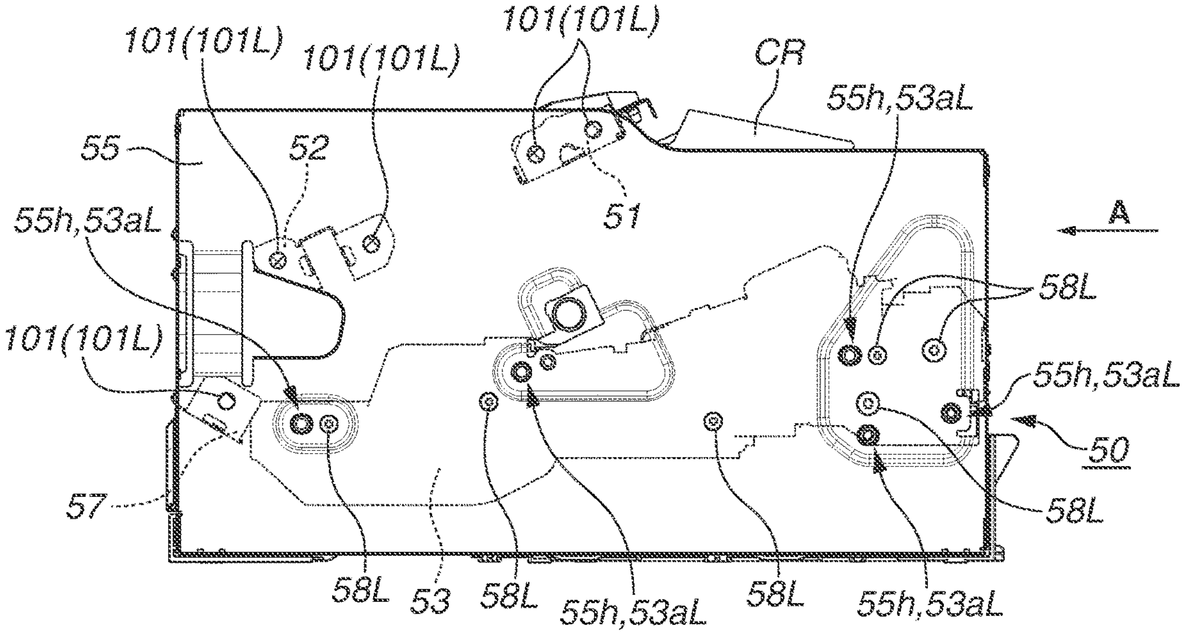
FIGS. 5A and 5B are side views illustrating the framework of the image forming apparatus.
Figure 5B:
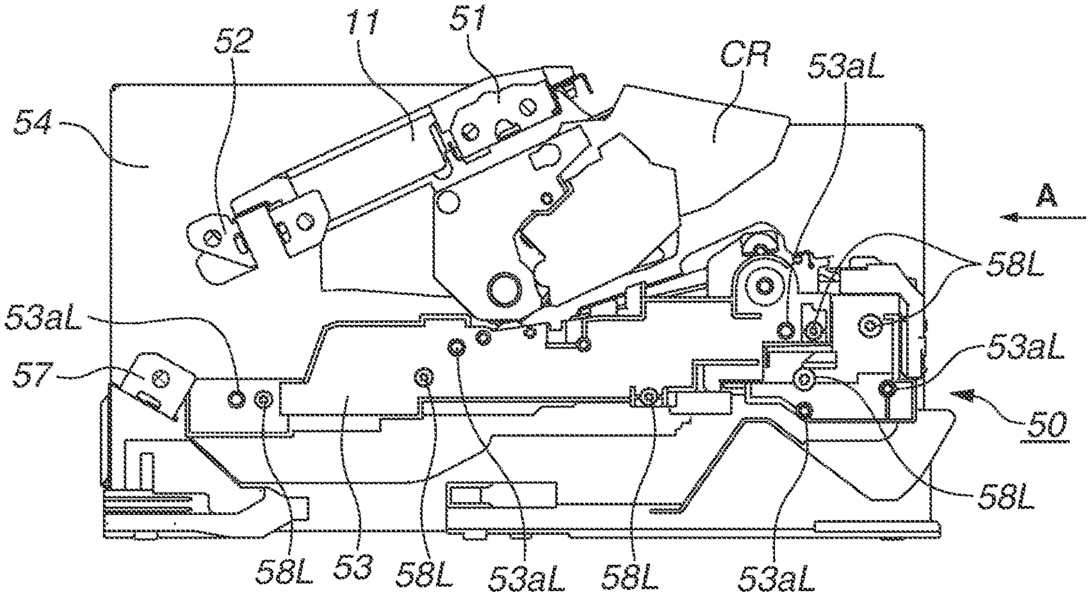

FIGS. 5A and 5B are side views illustrating the framework 50 of the image forming apparatus 100.

FIGS. 5A and 5B are side views illustrating the framework 50 viewed from the facing directions fd, more specifically, side views illustrating the framework 50 viewed from the left side. In FIG. 5B, the left side plate 55 is not shown.

Figure 6:
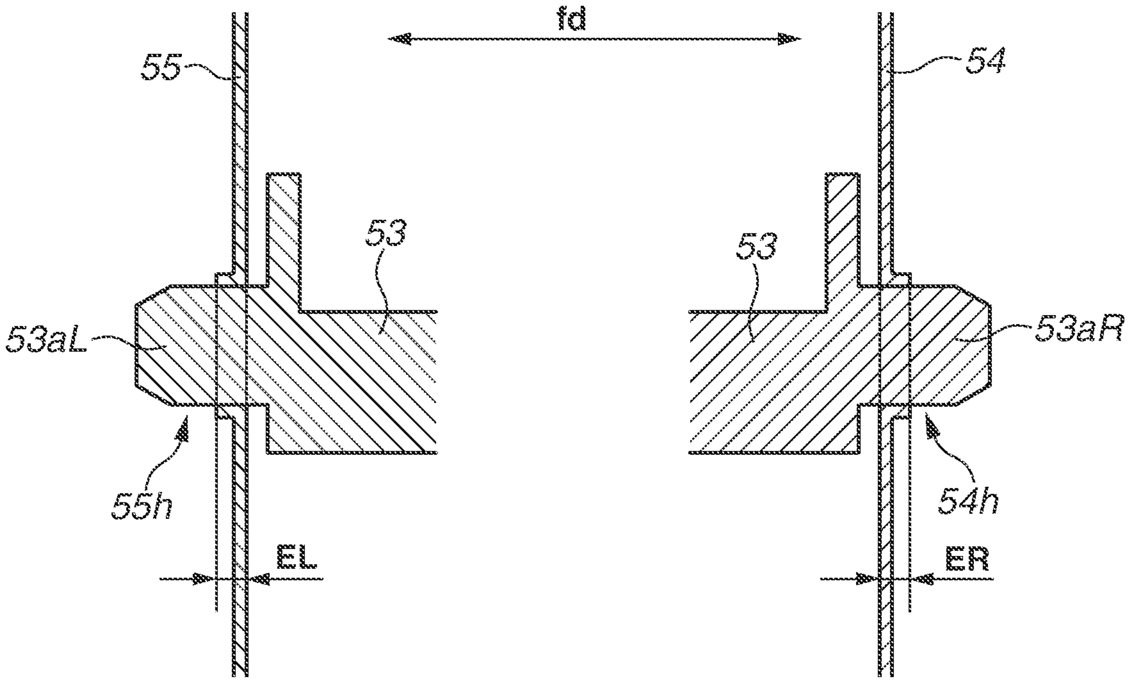
FIG. 6 is a diagram illustrating engagement of a left side plate and a right side plate and a transfer frame.

FIG. 6 is a diagram illustrating the engagement of the left side plate 55 and the right side plate 54 with the transfer frame 53.

As illustrated in FIGS. 2 and 4A, the transfer frame 53 includes protrusions 53*a*R, and the right side plate 54 includes holes 54*h*. As illustrated in FIGS. 4A and 6, the protrusions 53*a*R are inserted into the holes 54*h* of the right side plate 54 so that the transfer frame 53 is supported by the right side plate 54.

According to the present exemplary embodiment, the transfer frame 53 includes the plurality of protrusions 53*a*R, and the right side plate 54 includes the plurality of holes 54*h*. The plurality of holes 54*h* includes types of round hole and long hole. According to the present exemplary embodiment, the transfer frame 53 includes a plurality of frames each including at least one protrusion 53*a*R. The number of protrusions 53*a*R and the number of holes 54*h* can be set as appropriate.

As illustrated in FIG. 6, in the state where each protrusion 53*a*R is inserted in the corresponding hole 54*h*, the positions of the protrusion 53*a*R and the hole 54*h* overlap each other in the facing directions fd at an engaged portion ER formed through the insertion of the protrusion 53*a*R in the hole 54*h*. This restricts movement of the transfer frame 53 with respect to the right side plate 54 in the direction orthogonal to the facing directions fd. According to the present exemplary embodiment, the state where the protrusions 53*a*R are inserted in the holes 54*h* can also be described as a state where the protrusions 53*a*R are inserted through the right side plate 54 through the holes 54*h*. The engaged portion ER can also be described as an engaged portion formed through the engagement of the right side plate 54 and the transfer frame 53.

Alternatively, the transfer frame 53 can include holes corresponding to the holes 54*h*, and the right side plate 54 can include protrusions to be inserted into the holes. Specifically, either the transfer frame 53 or the right side plate 54 includes protrusions, and the other includes holes into which the protrusions are to be inserted.

According to the present exemplary embodiment, the transfer frame 53 is releasably secured to the right side plate 54. More specifically, the transfer frame 53 is secured to the right side plate 54 with a plurality of screws 58R as a fastening member. Removing the plurality of screws 58R releases the securing of the right side plate 54 and the transfer frame 53.

As illustrated in FIGS. 2 and 5A, the transfer frame 53 includes protrusions 53*a*L, and the left side plate 55 includes holes 55*h*. As illustrated in FIGS. 5A and 6, the protrusions 53*a*L are inserted into the holes 55*h* of the left side plate 55 so that the transfer frame 53 is supported by the left side plate 55.

According to the present exemplary embodiment, the transfer frame 53 includes the plurality of protrusions 53*a*L, and the left side plate 55 includes the plurality of holes 55*h*.

The plurality of holes 55*h* includes types of round hole and long hole. According to the present exemplary embodiment, the transfer frame 53 includes a plurality of frames each including at least one protrusion 53*a*L. The number of protrusions 53*a*L and the number of holes 55*h* can be set as appropriate.

As illustrated in FIG. 6, in the state where the protrusion 53*a*L is inserted in the corresponding hole 55*h*, the positions of the protrusions 53*a*L and the holes 55*h* overlap each other in the facing directions fd at an engaged portion EL formed through the insertion of the protrusion 53*a*L in the hole 55*h*. This restricts movement of the transfer frame 53 with respect to the left side plate 55 in the direction orthogonal to the facing directions fd.

According to the present exemplary embodiment, the state where the protrusions 53*a*L are inserted in the holes 55*h* can also be described as a state where the protrusions 53*a*L are inserted through the left side plate 55 through the holes 55*h*. The engaged portion EL can also be described as an engaged portion formed through the engagement of the left side plate 55 and the transfer frame 53.

Alternatively, the transfer frame 53 can include holes corresponding to the holes 55*h*, and the left side plate 55 can include protrusions to be inserted into the holes. Specifically, either the transfer frame 53 or the left side plate 55 includes protrusions, and the other includes holes into which the protrusions are to be inserted.

According to the present exemplary embodiment, the transfer frame 53 is releasably secured to the left side plate 55. More specifically, the transfer frame 53 is secured to the left side plate 55 with a plurality of screws 58L as a fastening member. Removing the plurality of screws 58L releases the securing of the left side plate 55 and the transfer frame 53.

According the present exemplary embodiment, the fastening direction (attachment direction) of the plurality of screws 58L and the fastening direction (attachment direction) of the plurality of screws 58R are directions that intersect with the fastening direction (attachment direction) of the plurality of screws 58F. Further, the fastening direction of the plurality of screws 58L and the fastening direction of the plurality of screws 58R are parallel to each other. Further, the fastening direction of the plurality of screws 58L and the fastening direction of the plurality of screws 58R are in the facing directions fd. The fastening direction of the plurality of screws 58F is a direction that intersects with (desirably a direction orthogonal to) the facing directions fd.

As illustrated in FIG. 4B, the transfer frame 53 is situated between the front stay 56 and the front scanner stay 51, the rear scanner stay 52, and the rear stay 57. Further, the front scanner stay 51 and the rear scanner stay 52 are located above the front stay 56.

As illustrated in FIGS. 4B and 5B, the cartridge CR is stored between the front scanner stay 51 and the rear scanner stay 52 and the transfer frame 53.

According to the present exemplary embodiment, the front scanner stay 51, the rear scanner stay 52, and the rear stay 57 are secured to the left side plate 55 and the right side plate 54 at securing portions 101 (101L, 101R) so that the front scanner stay 51, the rear scanner stay 52, and the rear stay 57 are not releasable from the left side plate 55 and the right side plate 54. This restricts movement of the front scanner stay 51, the rear scanner stay 52, and the rear stay 57 with respect to the left side plate 55 and the right side plate 54 in the facing directions fd, an orthogonal direction orthogonal to the facing directions fd, and a direction orthogonal to the facing directions fd and the orthogonal direction.

Either the left side plate 55 or the right side plate 54 can be referred to as a first side plate, and the other can be referred to as a second side plate. While the right side plate 54 is referred to as a first side plate and the left side plate 55 as a second side plate according to the present exemplary embodiment for convenience, the right side plate 54 can be referred to as a second side plate and the left side plate 55 as a first side plate.

Suppose that the right side plate 54 is referred to as a first side plate and the left side plate 55 as a second side plate, the securing portions 101R between the right side plate 54 and the front scanner stay 51, the rear scanner stay 52, and the rear stay 57 can be referred to as first securing portions. Further, the securing portions 101L between the left side plate 55 and the front scanner stay 51, the rear scanner stay 52, and the rear stay 57 can be referred to as second securing portions.

Further, the screws 58F that are fastened with the right side plate 54 can be referred to as first fastening members, and the screws 58F that are fastened with the left side plate 55 can be referred to as second fastening members. The screws 58R (the plurality of screws 58R) can be referred to as third fastening members, and the screws 58L (the plurality of screws 58L) can be referred to as fourth fastening members.

The protrusions 53*a*L and 53*a*R extend in the facing directions fd. The protrusions 53*a*R can be referred to as first protrusions, and the protrusions 53*a*L can be referred to as second protrusions. The holes 54*h* can be referred to as first holes, and the holes 55*h* can be referred to as second holes.

<Securing Portions>

As described below, the securing portions 101 are desirably formed through plastic deformation of at least one of the front scanner stay 51, the rear scanner stay 52, the rear stay 57, and the left side plate 55 and the right side plate 54.

According to the present exemplary embodiment, the securing portions 101 securing the front scanner stay 51, the rear scanner stay 52, or the rear stay 57 and the left side plate 55 or the right side plate 54 have the same configuration. The securing portions 101 will be described below with reference to FIGS. 7A to 7C and 8A to 8C.

Figure 7C:
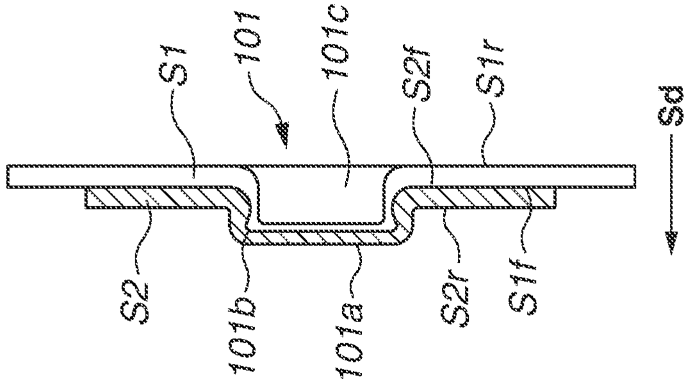
FIG. 7C is a cross-sectional view illustrating the securing portion.
Figure 7B:
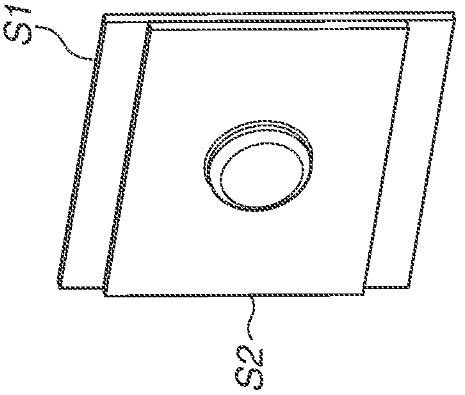
FIGS. 7A and 7B are perspective views illustrating a securing portion.
Figure 7A:
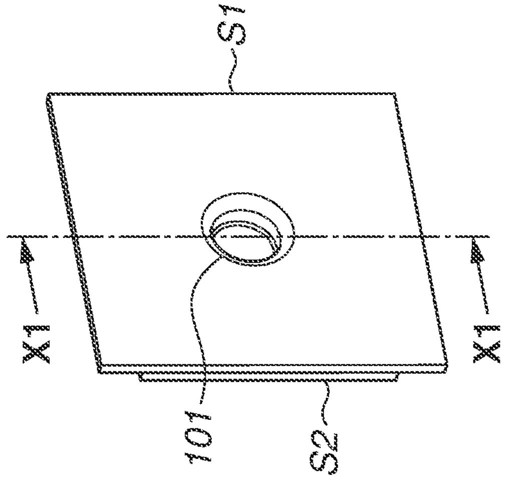

FIGS. 7A to 7C are diagrams illustrating an example of the securing portions 101. FIGS. 7A and 7B are perspective views illustrating the securing portion 101. FIG. 7C is a cross-sectional view illustrating the securing portion 101. Specifically, FIG. 7C is a cross-sectional view along X1-X1 in FIG. 7A.

A first sheet metal S1 and a second sheet metal S2 are secured to each other at the securing portion 101.

The front scanner stay 51, the rear scanner stay 52, and the rear stay 57 may correspond to the first sheet metal S1, the left side plate 55 and the right side plate 54 may correspond to the second sheet metal S2. The front scanner stay 51, the rear scanner stay 52, and the rear stay 57 may correspond to the second sheet metal S2, the left side plate 55 and the right side plate 54 may correspond to the first sheet metal S1.

In FIGS. 7A, 7B, and 7C, the securing portion 101 is formed through deformation of the first sheet metal S1 and the second sheet metal S2.

The first sheet metal S1 includes a first facing surface S1*f* and a first rear surface S1*r* on the reverse side of the first facing surface S1*f*. The second sheet metal S2 includes a second facing surface S2*f* facing the first facing surface S1*f* and a second rear surface S2*r* on the reverse side of the second facing surface S2*f*.

The first facing surface S1*f* and the first rear surface S1*r* are surfaces orthogonal to a thickness direction of the first sheet metal S1. The second facing surface S2*f* and the second rear surface S2*r* are surfaces orthogonal to a thickness direction of the second sheet metal S2.

The first sheet metal S1 and the second sheet metal S2 are deformed in a deformation direction (first direction) Sd.

The deformation direction Sd is a direction from the first rear surface S1*r* of the first sheet metal S1 toward the first facing surface S1*f* of the first sheet metal S1. The deformation direction Sd is desirably parallel to the thickness direction of the first sheet metal S1. The deformation direction Sd is desirably a direction in the facing directions fd, e.g. a direction parallel to the facing direction fd.

The securing portions 101 includes a projection portion 101*a* projecting relative to the second rear surface S2*r* of the second sheet metal S2 in the deformation direction Sd. According to the present exemplary embodiment, the projection portion 101*a* is formed through deformation of the second sheet metal S2. Further, a recessed portion 101*c* recessed in the first rear surface S1*r* toward the first facing surface S1*f* is formed through deformation of the first sheet metal S1. Specifically, the securing portion 101 according to the present exemplary embodiment includes the recessed portion 101*c*. The securing portion 101 according to the present exemplary embodiment is formed, so that a projection portion is not formed on the first rear surface S1*r*.

The securing portion 101 is formed using the following method. First, the first sheet metal S1 and the second sheet metal S2 are layered so that the first facing surface S1*f* and the second facing surface S2*f* come into contact with each other. Meanwhile, a receiving block with a recessed shape is placed on the side of the second rear surface S2*r* of the second sheet metal S2. Further, a cylindrical pressing member is placed on the side of the first rear surface S1*r* of the first sheet metal S1.

The pressing member presses the first rear surface S1*r* toward the recessed shape of the receiving block, whereby the first sheet metal S1 and the second sheet metal S2 are deformed and enter the recessed shape, forming the projection portion 101*a* and the recessed portion 101*c*. The shapes of the recessed shape and the pressing member can be designed so that in this case, part of the first sheet metal S1 extends outward in a radial direction of the pressing member to form a locking portion 101*b*. The formation of the locking portion 101*b* ensures, with greater reliability, that the first sheet metal S1 and the second sheet metal S2 are prevented from separating.

According to the present exemplary embodiment, the left side plate 55 and the right side plate 54 correspond to the first sheet metal S1, and the front scanner stay 51, the rear scanner stay 52, and the rear stay 57 correspond to the second sheet metal S2. Thus, the projection portion 101*a* projects toward a space between the left side plate 55 and the right side plate 54. In other words, the projection portion 101*a* projects facing the inside of the apparatus body 100A (the space between the left side plate 55 and the right side plate 54) in the facing direction fd. This makes it possible to reduce the interval between the projection portions 101*a* of the securing portions 101L formed on the left side plate 55 and the projection portion 101*a* of the securing portions 101R formed on the right side plate 54 in the facing directions fd.

Figure 8C:
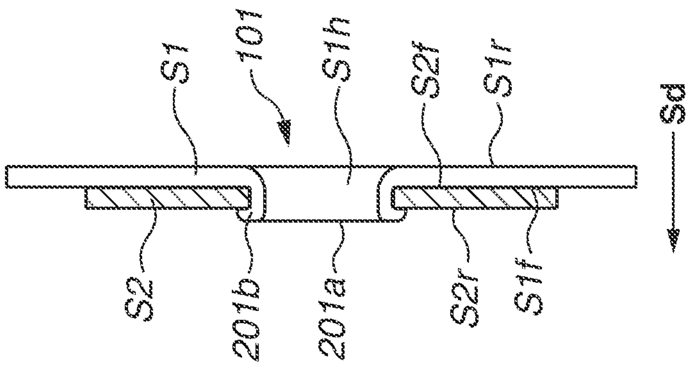
FIG. 8C is a cross-sectional view illustrating the securing portion.
Figure 8B:
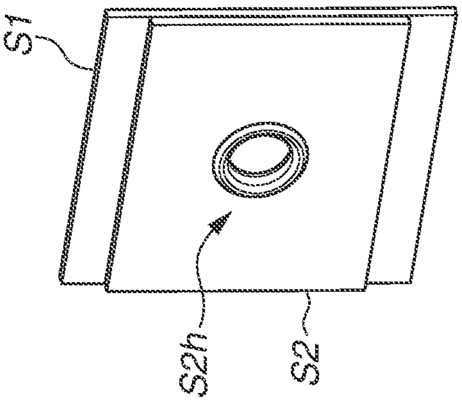
FIGS. 8A and 8B are perspective views illustrating a securing portion.
Figure 8A:
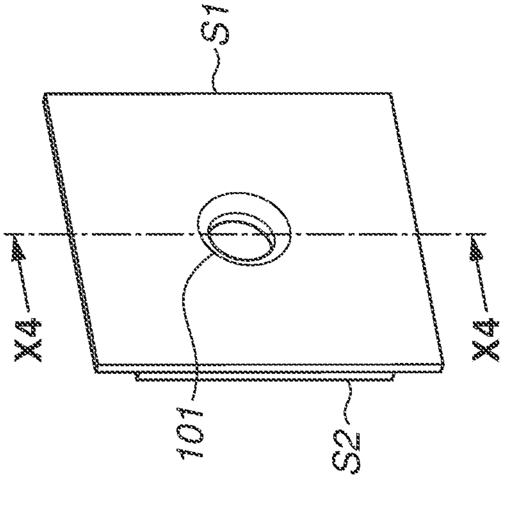

Further, the securing portions 101 can have a structure as illustrated in FIGS. 8A to 8C. FIGS. 8A to 8C are diagrams illustrating another example of the securing portion 101. FIGS. 8A and 8B are perspective views illustrating the securing portion 101. FIG. 8C is a cross-sectional view illustrating the securing portion 101. Specifically, FIG. 8C is a cross-sectional view along X4-X4 in FIG. 8A.

The securing portion 101 illustrated in FIGS. 7A to 7C is formed through deformation of the first sheet metal S1 and the second sheet metal S2. In the securing portion 101 illustrated in FIGS. 8A to 8C, the first sheet metal S1 and the second sheet metal S2 are secured to each other through deformation of the first sheet metal S1.

Specifically, the securing portion 101 illustrated in FIGS. 8A to 8C is formed through deformation of the first sheet metal S1. The first sheet metal S1 is deformed in the deformation direction Sd and enters a hole S2*h* in the second sheet metal S2, forming a projection portion 201*a*. Specifically, the securing portion 101 includes the projection portion 201*a* projecting relative to the second rear surface S2*r* of the second sheet metal S2 in the deformation direction Sd. The projection portion 201*a* of the securing portion 101 illustrated in FIGS. 8A to 8C is formed through deformation of the first sheet metal S1. The securing portion 101 according to the present exemplary embodiment is formed, so that a projection portion is not formed on the first rear surface S1*r*.

The securing portion 101 illustrated in FIGS. 8A to 8C can be formed by so-called burring caulking. By deformation of part of the first sheet metal S1, a cylindrical shape with a hole S1*h* is formed, and the cylindrical shape enters the hole S2*h*. Further deformation of the leading edge of the cylindrical shape that has entered the hole S2*h* forms a locking portion 201*b*. The locking portion 201*b* ensures, with greater reliability, that the first sheet metal S1 and the second sheet metal S2 are prevented from separating.

In the securing portion 101 illustrated in FIGS. 8A to 8C, the left side plate 55 and the right side plate 54 correspond to the first sheet metal S1, and the front scanner stay 51, the rear scanner stay 52, and the rear stay 57 correspond to the second sheet metal S2. Thus, the projection portion 201*a* projects toward the space between the left side plate 55 and the right side plate 54.

In other words, the projection portion 201*a* projects toward the inside of the apparatus body 100A in the facing directions fd.

While the projection portion 201*a* is formed by burring caulking, another method, such as press mechanical fastening, can be used as a method for deforming the first sheet metal S1 to form a projection portion.

The securing portions 101 illustrated in FIGS. 7A to 7C and 8A to 8C can be referred to as mechanical fastening portions formed through plastic deformation of the first sheet metal S1 or the first sheet metal S1 and the second sheet metal S2 without using rivets.

Securing the front scanner stay 51, the rear scanner stay 52, and the rear stay 57 to the left side plate 55 and the right side plate 54 using the securing portions 101 eliminates the need to use fastening parts, such as screws or rivets. This makes it possible to reduce spaces for placing parts, such as screws or rivets, and part costs. Further, the rigidity of the framework 50 is enhanced.

Furthermore, the method of forming mechanical fastening portions through plastic deformation of the first sheet metal S1 or the first sheet metal S1 and the second sheet metal S2 does not generate discharge, heat, or sparks, which are generated in welding (electric welding). Further, adhesive bonding agents for adhesive bonding of the first sheet metal S1 and the second sheet metal S2 are also unnecessary.

The front scanner stay 51, the rear scanner stay 52, and the rear stay 57 are connected to the left side plate 55 and the right side plate 54 so that the front scanner stay 51, the rear scanner stay 52, and the rear stay 57 are not releasable from the left side plate 55 and the right side plate 54. The securing of the front scanner stay 51, the rear scanner stay 52, or the rear stay 57 and the left side plate 55 or the right side plate 54 is released by plastic deformation of at least one of the front scanner stay 51, the rear scanner stay 52, or the rear stay 57 and the left side plate 55 or the right side plate 54. In this case, the plastic deformation includes an action of cutting a target part.

<Method for Assembly of Image Forming Apparatus>

A method for the assembly of the image forming apparatus 100 according to the present exemplary embodiment will be described.

The method for the assembly of the image forming apparatus 100 includes a process of assembling the framework 50 (a method of manufacturing the framework 50).

The process of assembling the framework 50 will be described. The right side plate 54 and the left side plate 55 are attached to the transfer frame 53, the front scanner stay 51, the rear scanner stay 52, and the rear stay 57. At this time, the protrusions 53*a*R of the transfer frame 53 are inserted into the holes 54*h*, and the protrusions 53*a*L of the transfer frame 53 are inserted into the holes 55*h*.

The securing portions 101 are formed in a state where the transfer frame 53, the front scanner stay 51, the rear scanner stay 52, and the rear stay 57 are sandwiched between the left side plate 55 and the right side plate 54. As a result, the front scanner stay 51, the rear scanner stay 52, and the rear stay 57 are secured to the left side plate 55 and the right side plate 54. Then, the transfer frame 53 is secured to the left side plate 55 with the screws 58L, and the transfer frame 53 is secured to the right side plate 54 with the screws 58R. Further, the front stay 56 is secured to the left side plate 55 and the right side plate 54 with the screws 58F. The framework 50 is assembled as described above.

After the front scanner stay 51, the rear scanner stay 52, and the rear stay 57 are secured to the left side plate 55 and the right side plate 54, widening the interval between the left side plate 55 and the right side plate 54 is restricted. Thus, before the front scanner stay 51, the rear scanner stay 52, and the rear stay 57 are secured to the left side plate 55 and the right side plate 54, the protrusions 53*a*R are inserted into the holes 54*h*, and the protrusions 53*a*L are inserted into the holes 55*h*.

Specifically, the left side plate 55 and the right side plate 54 are attached to the transfer frame 53 before the securing portions 101 are formed. In other words, the securing portions 101 are formed after the left side plate 55 and the right side plate 54 are attached to the transfer frame 53.

For example, in a case of securing the front scanner stay 51, the rear scanner stay 52, and the rear stay 57 to the left side plate 55 and the right side plate 54 by welding, heat and sparks may be generated by the welding. Thus, if the front scanner stay 51, the rear scanner stay 52, and the rear stay 57 are to be secured by welding in a state where the left side plate 55 and the right side plate 54 are attached to the transfer frame 53, materials that can be used in the transfer frame 53 are limited.

Further, according to the present exemplary embodiment, the front scanner stay 51, the rear scanner stay 52, and the rear stay 57 are secured to the left side plate 55 and the right side plate 54 after a solenoid 54*r* (refer to FIG. 2) is attached to the right side plate 54. Further, the front scanner stay 51, the rear scanner stay 52, and the rear stay 57 are secured to the left side plate 55 and the right side plate 54 with an electronic board (not illustrated) of the transfer frame 53 facing the left side plate 55.

For example, in a case where electric welding is to be performed, attaching parts operated by electricity to the left side plate 55, the right side plate 54, the front scanner stay 51, the rear scanner stay 52, the rear stay 57, or a nearby portion, before the electric welding, is restricted. Examples of parts operated by electricity include actuators, such as solenoids and motors, various electric parts, and electronic boards.

The securing portions 101 according to the present exemplary embodiment are formed through plastic deformation of at least one of the left side plate 55 or the right side plate 54 and the front scanner stay 51, the rear scanner stay 52, or the rear stay 57. Specifically, no discharge occurs in forming the securing portions 101. This makes it possible to attach parts operated by electricity to the left side plate 55, the right side plate 54, the front scanner stay 51, the rear scanner stay 52, the rear stay 57, or a nearby portion before the securing portions 101 are formed.

Securing the front scanner stay 51, the rear scanner stay 52, and the rear stay 57 to the left side plate 55 and the right side plate 54 with the securing portions 101 as described above reduces limitations on an assembly sequence of the image forming apparatus 100. For example, the front scanner stay 51, the rear scanner stay 52, and the rear stay 57 can be secured to the left side plate 55 and the right side plate 54 after the left side plate 55 and the right side plate 54 are attached to the transfer frame 53. Further, parts operated by electricity can be attached to the left side plate 55, the right side plate 54, the front scanner stay 51, the rear scanner stay 52, the rear stay 57, or a nearby portion before the securing portions 101 are formed. Furthermore, the degree of freedom in selecting the material of the transfer frame 53 (the material of a part for use in the image forming apparatus 100) increases.

<Disassembly of Image Forming Apparatus>

The left side plate 55, the right side plate 54, the front scanner stay 51, the rear scanner stay 52, and the rear stay 57 of the image forming apparatus 100 are made of metal, whereas the transfer frame 53 of the image forming apparatus 100 is made of resin.

The image forming apparatus 100 can be disassembled, and the transfer frame 53 can be detached from the framework 50 in a state where the front scanner stay 51, the rear scanner stay 52, and the rear stay 57 are secured to the left side plate 55 and the right side plate 54. Specifically, the transfer frame 53, which is a resin part, of the image forming apparatus 100 can be separated from the framework 50, which includes both a metal part and a resin part, of the image forming apparatus 100.

A method for disassembly of the image forming apparatus 100 according to the present exemplary embodiment will be described with reference to FIGS. 9A, 9B, 10, 11, and 12. The method for disassembly of the image forming apparatus 100 includes a process of disassembling the framework 50 (a method of disassembling the framework 50). The method of disassembling the framework 50 includes a process of detaching (removing) the transfer frame 53.

FIGS. 9A, 9B, 10, 11, and 12 are diagrams illustrating the disassembly of the image forming apparatus 100.

As illustrated in FIG. 6, in a state where the protrusions 53*a*R are inserted in the holes 54*h*, movement of the transfer frame 53 with respect to the right side plate 54 in the direction orthogonal to the facing directions fd is restricted. Further, in a state where the protrusions 53*a*L are inserted in the holes 55*h*, movement of the transfer frame 53 with respect to the left side plate 55 in the direction orthogonal to the facing directions fd is restricted.

In a state where the front stay 56 is secured to the right side plate 54 and the left side plate 55, widening the interval between the left side plate 55 and the right side plate 54 is restricted. Thus, in this state, removal of the protrusions 53*a*R from the holes 54*h* and removal of the protrusions 53*a*L from the holes 55*h* are restricted, and detachment (removal) of the transfer frame 53 from the left side plate 55 and the right side plate 54 is restricted.

Figure 9A:
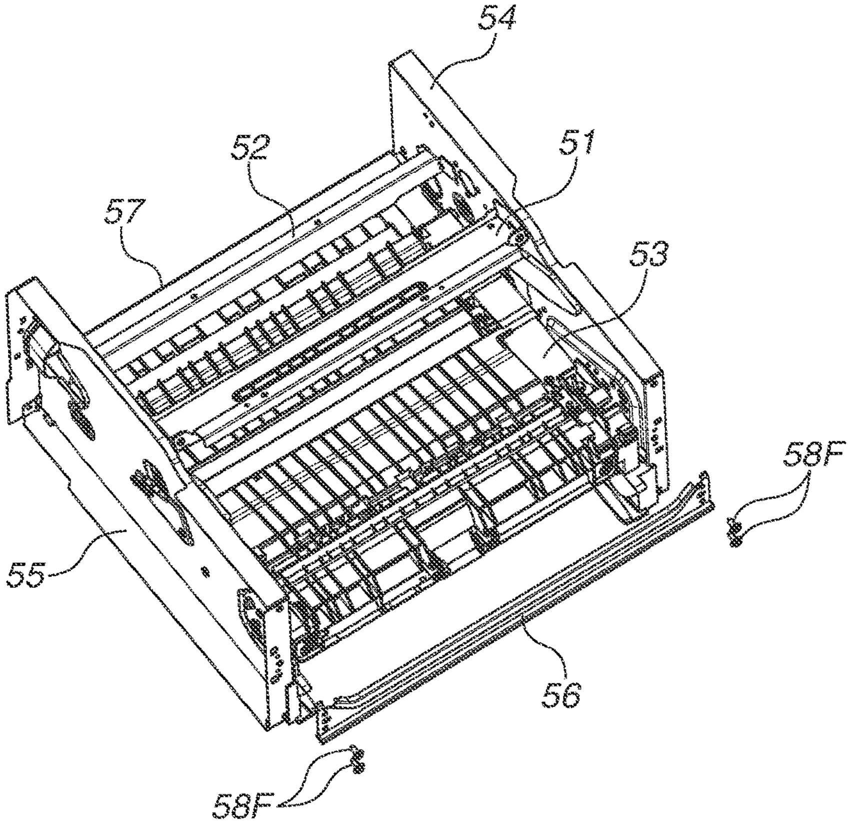
FIGS. 9A and 9B are diagrams illustrating disassembly of the image forming apparatus.

Thus, the securing of the front stay 56 and at least one of the left side plate 55 and the right side plate 54 is released. As illustrated in FIG. 9A, the screws 58F for securing the front stay 56 to the left side plate 55 are detached (removed) from the front stay 56 and the left side plate 55. This releases the securing of the front stay 56 and the left side plate 55. The screws 58F for securing the front stay 56 to the right side plate 54 are detached (removed) from the front stay 56 and the right side plate 54. This releases the securing of the front stay 56 and the right side plate 54.

After the securing of the front stay 56 and the left side plate 55 and the securing of the front stay 56 and the right side plate 54 are released, the front stay 56 can be detached (removed) from the right side plate 54 and the left side plate 55.

Figure 9B:
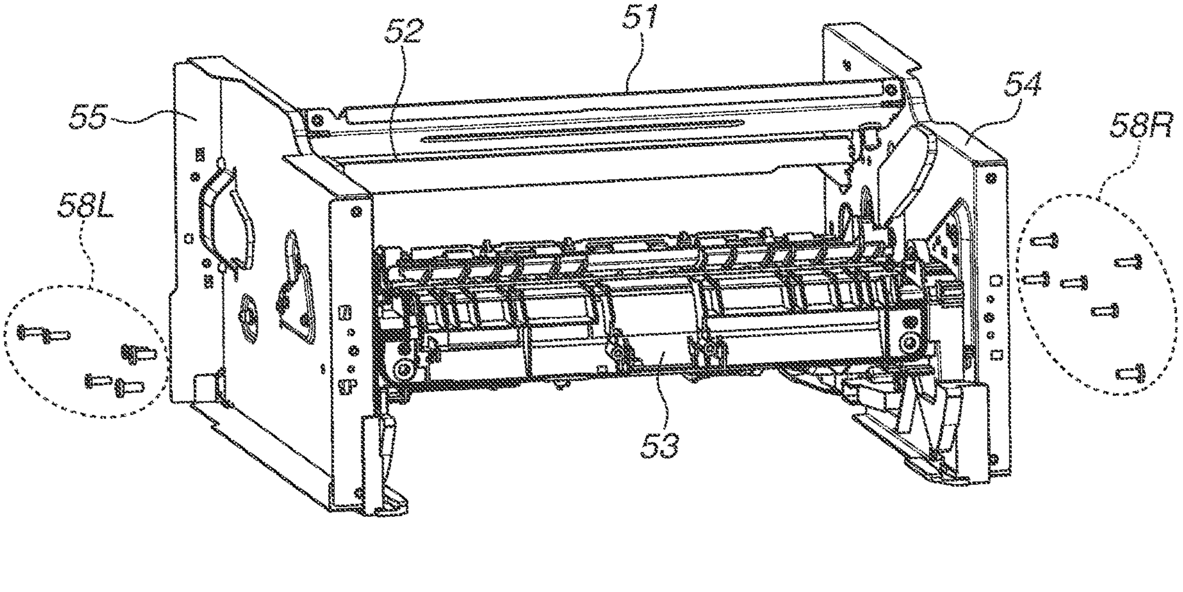

Furthermore, according to the present exemplary embodiment, the screws 58L for securing the transfer frame 53 to the left side plate 55 are detached (removed) from the transfer frame 53 and the left side plate 55 as illustrated in FIG. 9B. This releases the securing of the transfer frame 53 and the left side plate 55. The screws 58R for securing the transfer frame 53 to the right side plate 54 are detached (removed) from the transfer frame 53 and the right side plate 54. This releases the securing of the transfer frame 53 and the right side plate 54.

The screws 58F, 58L, and 58R can be removed in any order. Further, the screws 58L and 58R can be removed before the front stay 56 is detached.

Releasing at least one of the securing of the front stay 56 and the left side plate 55 and the securing of the front stay 56 and the right side plate 54 and releasing the securing of the left side plate 55 and the right side plate 54 and the transfer frame 53 makes it possible to widen the interval between the left side plate 55 and the right side plate 54.

While the screws 58L and 58R are used to secure the transfer frame 53 to the left side plate 55 and the right side plate 54 according to the present exemplary embodiment, the transfer frame 53 can be sandwiched between the left side plate 55 and the right side plate 54 without using the screws 58L and 58R. In this case, releasing at least one of the securing of the front stay 56 and the left side plate 55 and the securing of the front stay 56 and the right side plate 54 makes it possible to widen the interval between the left side plate 55 and the right side plate 54.

Figure 10:
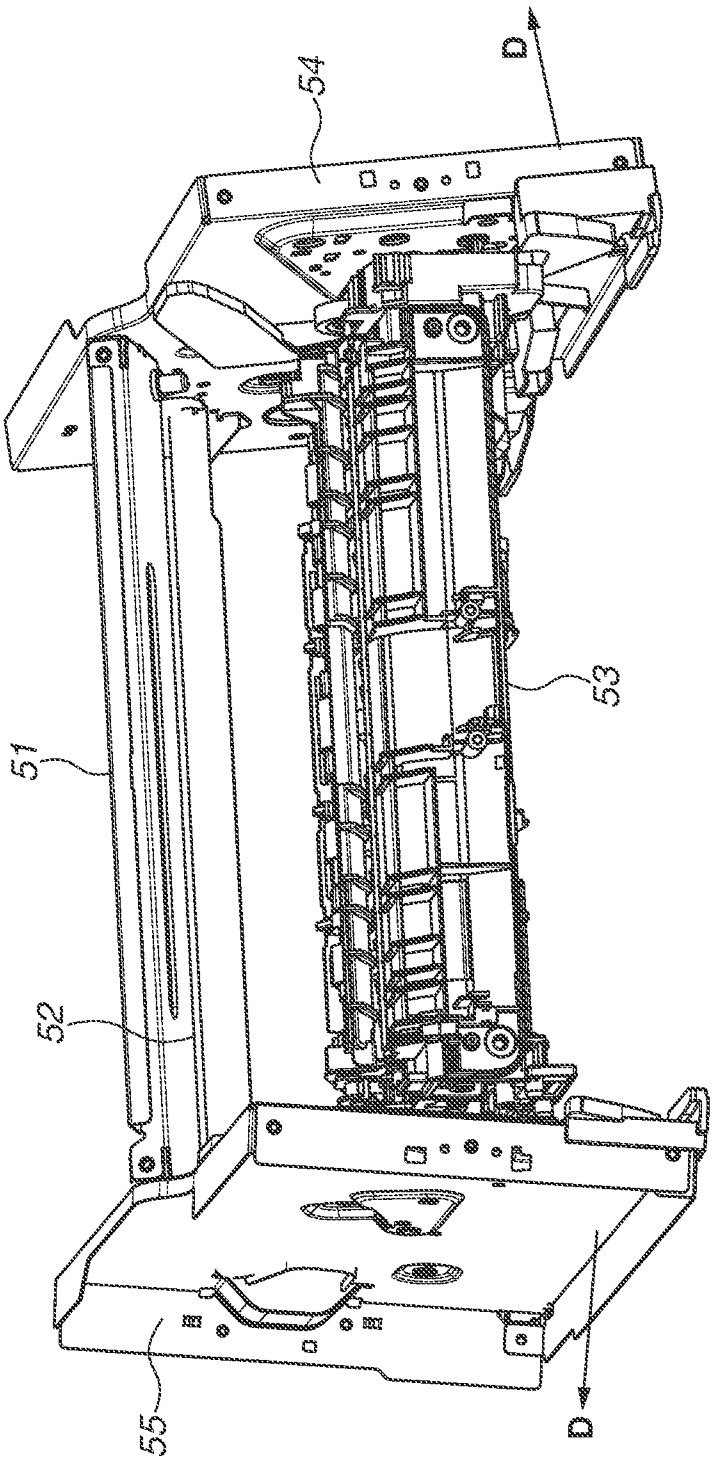
FIG. 10 is a diagram illustrating disassembly of the image forming apparatus.

In a state where the widening of the interval between the left side plate 55 and the right side plate 54 is allowed, movement of the right side plate 54 with respect to the transfer frame 53 and movement of the left side plate 55 with respect to the transfer frame 53 are allowed, as illustrated in FIG. 10. More specifically, as illustrated in FIG. 10, the left side plate 55 and the right side plate 54 move in an arrow-D direction with respect to the transfer frame 53. At this time, at least one of the left side plate 55, the right side plate 54, the front scanner stay 51, the rear scanner stay 52, and the rear stay 57 is deformed.

Figure 11:
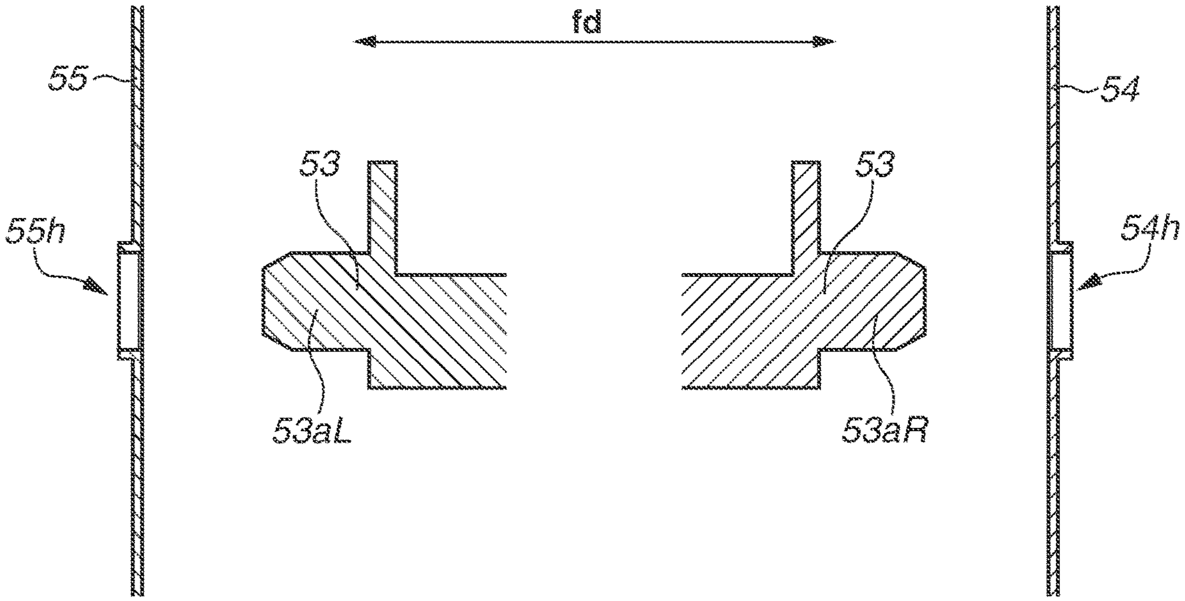
FIG. 11 is a diagram illustrating disassembly of the image forming apparatus.

As illustrated in FIG. 11, moving the right side plate 54 with respect to the transfer frame 53 removes the protrusion 53*a*R from the hole 54*h* to release the engagement of the protrusion 53*a*R and the hole 54*h*. Similarly, moving the left side plate 55 with respect to the transfer frame 53 removes the protrusion 53*a*L from the hole 55*h* to release the engagement of the protrusion 53*a*L and the hole 55*h*.

As a result, the transfer frame 53 is detachable from the left side plate 55 and the right side plate 54 in a state where the front scanner stay 51, the rear scanner stay 52, and the rear stay 57 are secured to the left side plate 55 and the right side plate 54 with the securing portions 101.

Figure 12:
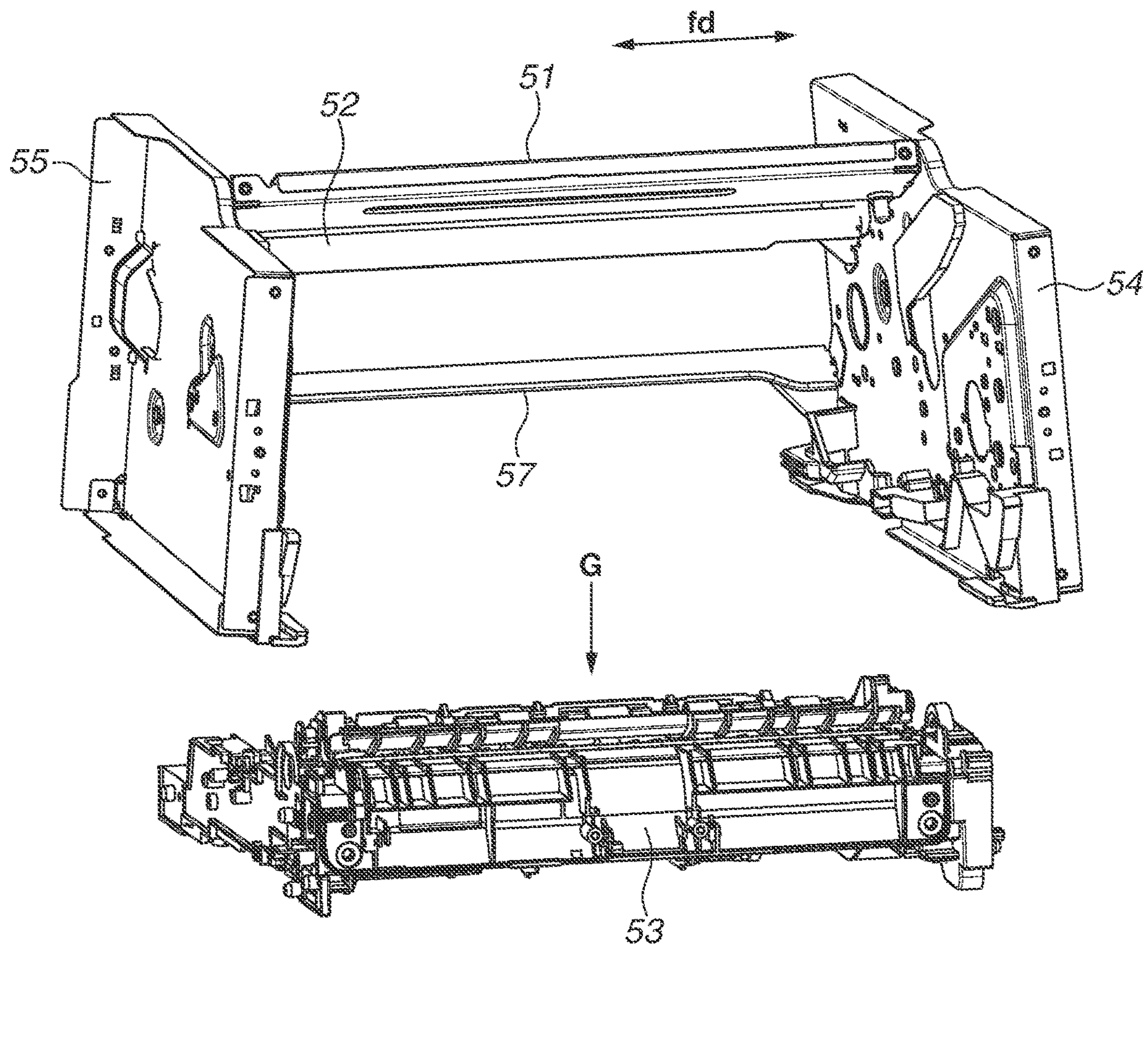
FIG. 12 is a diagram illustrating disassembly of the image forming apparatus.

As illustrated in FIG. 12, the transfer frame 53 is moved with respect to the right side plate 54 and the left side plate 55 in an orthogonal direction G orthogonal to the facing directions fd and is removed from the right side plate 54 and the left side plate 55.

The left side plate 55, the right side plate 54, the front scanner stay 51, the rear scanner stay 52, and the rear stay 57 are made of metal, whereas the transfer frame 53 is made of resin. The foregoing disassembly method makes it possible to detach the transfer frame 53 from the framework 50 in a state where the front scanner stay 51, the rear scanner stay 52, and the rear stay 57 are secured to the left side plate 55 and the right side plate 54. Specifically, the transfer frame 53, which is a resin part, can be separated from the framework 50, which includes both a metal part and a resin part.

<Modified Examples>

While the plurality of first connecting members is secured to the right side plate 54 and the left side plate 55 so that the plurality of first connecting members is not releasable from the right side plate 54 and the left side plate 55 according to the present exemplary embodiment, any number of first connecting members can be used. For example, a single first connecting member can be secured to the right side plate 54 and the left side plate 55.

While a single second connecting member is secured to the right side plate 54 and the left side plate 55 so that the single second connecting member is releasable from the right side plate 54 and the left side plate 55 according to the present exemplary embodiment, any number of second connecting members can be used. For example, a plurality of second connecting members can be secured to the right side plate 54 and the left side plate 55.

According to the present exemplary embodiment, the front scanner stay 51 and the rear scanner stay 52 are situated above the cartridge CR in the vertical direction whereas the transfer frame 53 is situated below the cartridge CR in the vertical direction, when viewed from the facing directions fd. Further, the cartridge CR and the transfer frame 53 are situated between the rear stay 57 and the front stay 56 in the horizontal direction, when viewed from the facing directions fd. The arrangement of the front scanner stay 51, the rear scanner stay 52, the rear stay 57, the transfer frame 53, and the cartridge CR is not limited to the above-described arrangement.

Further, the front stay 56 as a second connecting member is releasably secured to the left side plate 55 and the right side plate 54 at the front side (front surface) of the image forming apparatus 100 in the horizontal direction. However, the position at which the second connecting member is releasably secured to the left side plate 55 and the right side plate 54 can be at least one of the top side (top surface), the bottom side (bottom surface), the front side (front surface), and the rear side (rear surface) of the image forming apparatus 100.

As described above, the present invention enables further development of conventional technologies.

While the present invention has been described with reference to exemplary embodiments, it is to be understood that the invention is not limited to the disclosed exemplary embodiments. The scope of the following claims is to be accorded the broadest interpretation so as to encompass all and equivalent structures and functions.

This application claims the benefit of Japanese Patent Application No. 2023-012437, filed Jan. 31, 2023, which is hereby incorporated by reference herein in its entirety.

What is claimed is:

1. An image forming apparatus configured to form an image on a recording material, the image forming apparatus comprising:

a first side plate made of metal;

a second side plate made of metal, the second side plate facing the first side plate in a first direction;

a first connecting member made of metal, the first connecting member being secured to the first side plate at a first securing portion so that the first connecting member is not releasable from the first side plate, and the first connecting member being secured to the second side plate at a second securing portion so that the first connecting member is not releasable from the second side plate;

a second connecting member secured to the first side plate and the second side plate so that the second connecting member is releasable from the first side plate and the second side plate; and a frame made of resin, the frame being sandwiched between the first side plate and the second side plate and being secured to the first side plate and the second side plate so that the frame is releasable from the first side plate and the second side plate, wherein in a state where the second connecting member is secured to the first side plate and the second side plate, detachment of the frame from the first side plate and the second side plate is restricted, and wherein the frame in a state where the first connecting member is secured to the first side plate and the second side plate is detachable from the first side plate and the second side plate by releasing the securing of the second connecting member and at least one of the first side plate and the second side plate and releasing the securing of the first side plate and the second side plate and the frame.

2. The image forming apparatus according to claim 1, wherein one of the first side plate and the frame includes a first hole, an other of the first side plate and the frame includes a first protrusion inserted in the first hole, one of the second side plate and the frame includes a second hole, and an other of the second side plate and the frame includes a second protrusion inserted in the second hole, and wherein in a state where the securing of the second connecting member and at least one of the first side plate and the second side plate is released, the first side plate is movable with respect to the frame in such a manner that the first hole and the first protrusion is disengaged, and the second side plate is movable with respect to the frame in such a manner that the second hole and the second protrusion is disengaged.

3. The image forming apparatus according to claim 2, wherein the first protrusion extends in the first direction, and the second protrusion extends in the first direction.

4. The image forming apparatus according to claim 2, wherein the frame includes the first protrusion and the second protrusion.

5. The image forming apparatus according to claim 1, wherein the frame is moved in an orthogonal direction orthogonal to the first direction and is detached from the first side plate and the second side plate.

6. The image forming apparatus according to claim 1, wherein the frame is situated between the first connecting member and the second connecting member.

7. The image forming apparatus according to claim 1, wherein the first connecting member is situated above the second connecting member.

8. The image forming apparatus according to claim 1, wherein the second connecting member is made of metal.

9. The image forming apparatus according to claim 1, wherein the first connecting member supports an exposure device configured to expose a photosensitive member.

10. The image forming apparatus according to claim 1, wherein the frame includes a guide portion configured to guide the recording material.

11. The image forming apparatus according to claim 1, wherein the first connecting member is secured to the first side plate by mechanical fastening, adhesive bonding, or welding, and the first connecting member is secured to the second side plate by mechanical fastening, adhesive bonding, or welding.

12. The image forming apparatus according to claim 1, wherein the second connecting member is secured to the first side plate with a first fastening member so that the second connecting member is releasable from the first side plate, and the second connecting member is secured to the second side plate with a second fastening member so that the second connecting member is releasable from the second side plate, wherein the frame is secured to the first side plate with a third fastening member so that the frame is releasable from the first side plate, and the frame is secured to the second side plate with a fourth fastening member so that the frame is releasable from the second side plate, and wherein removal of the first fastening member releases the securing of the first side plate and the second connecting member, removal of the second fastening member releases the securing of the second side plate and the second connecting member, removal of the third fastening member releases the securing of the first side plate and the frame, and removal of the fourth fastening member releases the securing of the second side plate and the frame.

* * * * *